(12) United States Patent  
Bouwers et al.

(10) Patent No.: US 7,721,981 B2  
(45) Date of Patent: May 25, 2010

(54) MECHANICAL BRUSH CHIPPER FEED CONTROL BAR

(75) Inventors: John T. B. Bouwers, Pella, IA (US); Larry D. Schut, Pella, IA (US)

(73) Assignee: Vermeer Manucaturing Co., Pella, IA (US)

( * ) Notice: Subject to any disclaimer, the term of this patent is extended or adjusted under 35 U.S.C. 154(b) by 0 days.

(21) Appl. No.: 12/393,169

(22) Filed: Feb. 26, 2009

(65) Prior Publication Data

US 2009/0159731 A1    Jun. 25, 2009

Related U.S. Application Data

(62) Division of application No. 11/172,209, filed on Jun. 30, 2005, now Pat. No. 7,543,767.

(51) Int. Cl.
   *B02C 23/00* (2006.01)
   *B02C 4/32* (2006.01)
   *B02C 7/14* (2006.01)
   *B02C 9/04* (2006.01)
   *B02C 11/08* (2006.01)

(52) U.S. Cl. .............. 241/34; 241/92; 241/36; 144/246.1; 144/248.6

(58) Field of Classification Search ............ 241/34, 241/36, 92; 144/246.1, 248.2, 248.6, 176
See application file for complete search history.

(56) References Cited

U.S. PATENT DOCUMENTS

| 3,182,917 | A | | 5/1965 | Simon |
|---|---|---|---|---|
| 3,819,121 | A | * | 6/1974 | Rogers ............ 241/240 |
| 3,861,602 | A | | 1/1975 | Smith |
| 4,442,877 | A | | 4/1984 | Uitermarkt |
| 5,692,548 | A | | 12/1997 | Bouwers |
| 5,692,549 | A | | 12/1997 | Eggers |
| 7,044,409 | B2 | | 5/2006 | Stelter |
| 2004/0108397 | A1 | | 6/2004 | O'Halloran et al. |

* cited by examiner

*Primary Examiner*—Bena Miller
(74) *Attorney, Agent, or Firm*—Sturm & Fix LLP

(57) ABSTRACT

A mechanical control mechanism for the feed of a brush chipper is disclosed. The feed control bar has four positions: (1) forward or feed, (2) neutral, (3) reverse, and (4) stop. The hydraulic control valve has the three usual positions: (1) forward or feed, (2) neutral, (3) reverse. A function of the feed control bar is to provide the three function of the hydraulic control valve, plus the fourth in a fashion amenable to emergency situations. To these ends, the control bar has an extreme rearward position wherein the feed mechanism is stopped. The only permissible change to the stopped condition of the feed mechanism is to reverse the feed. Until a reset lever is manipulated, the hydraulic control valve cannot be put into a forward feed position.

3 Claims, 20 Drawing Sheets

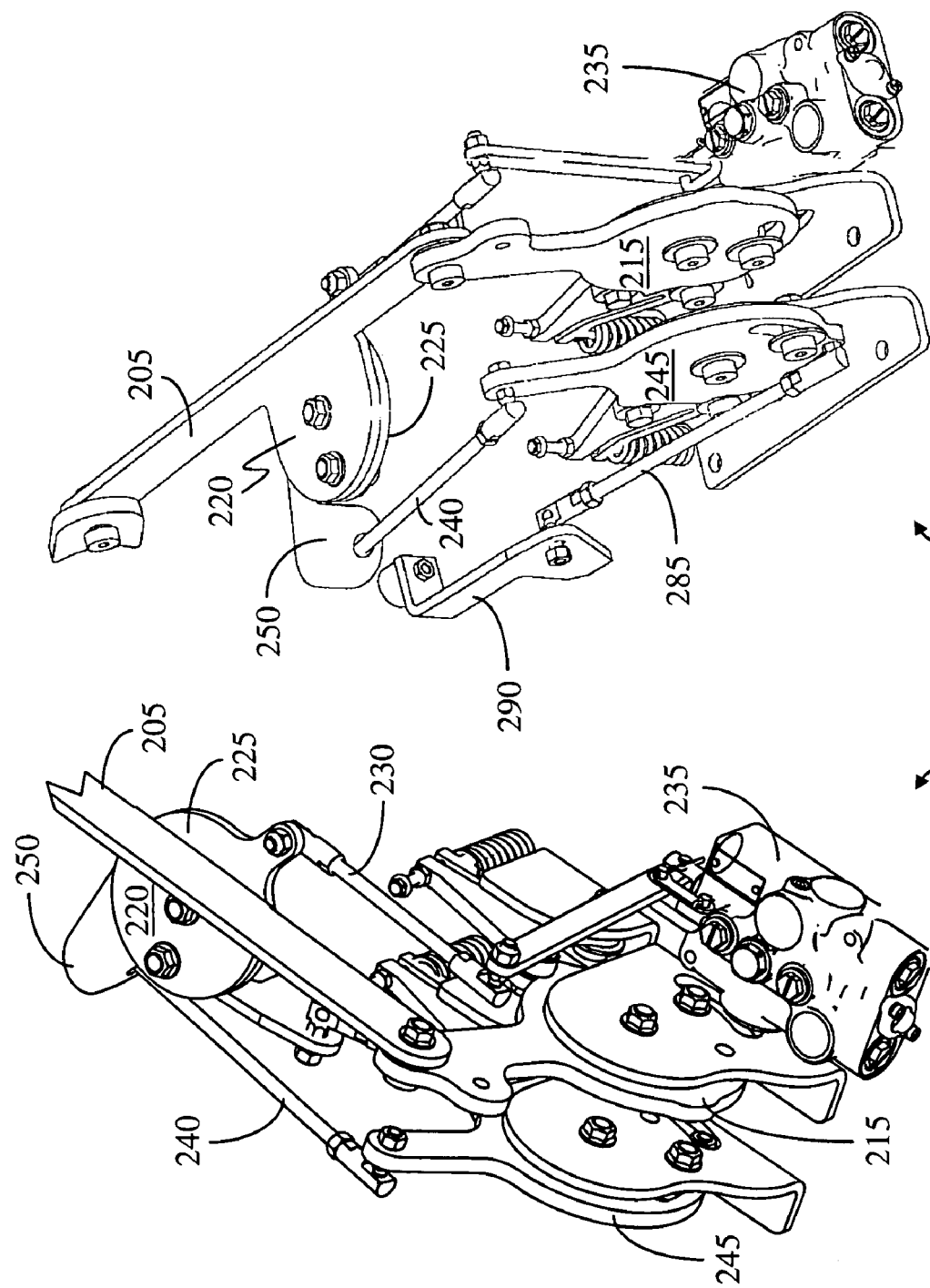

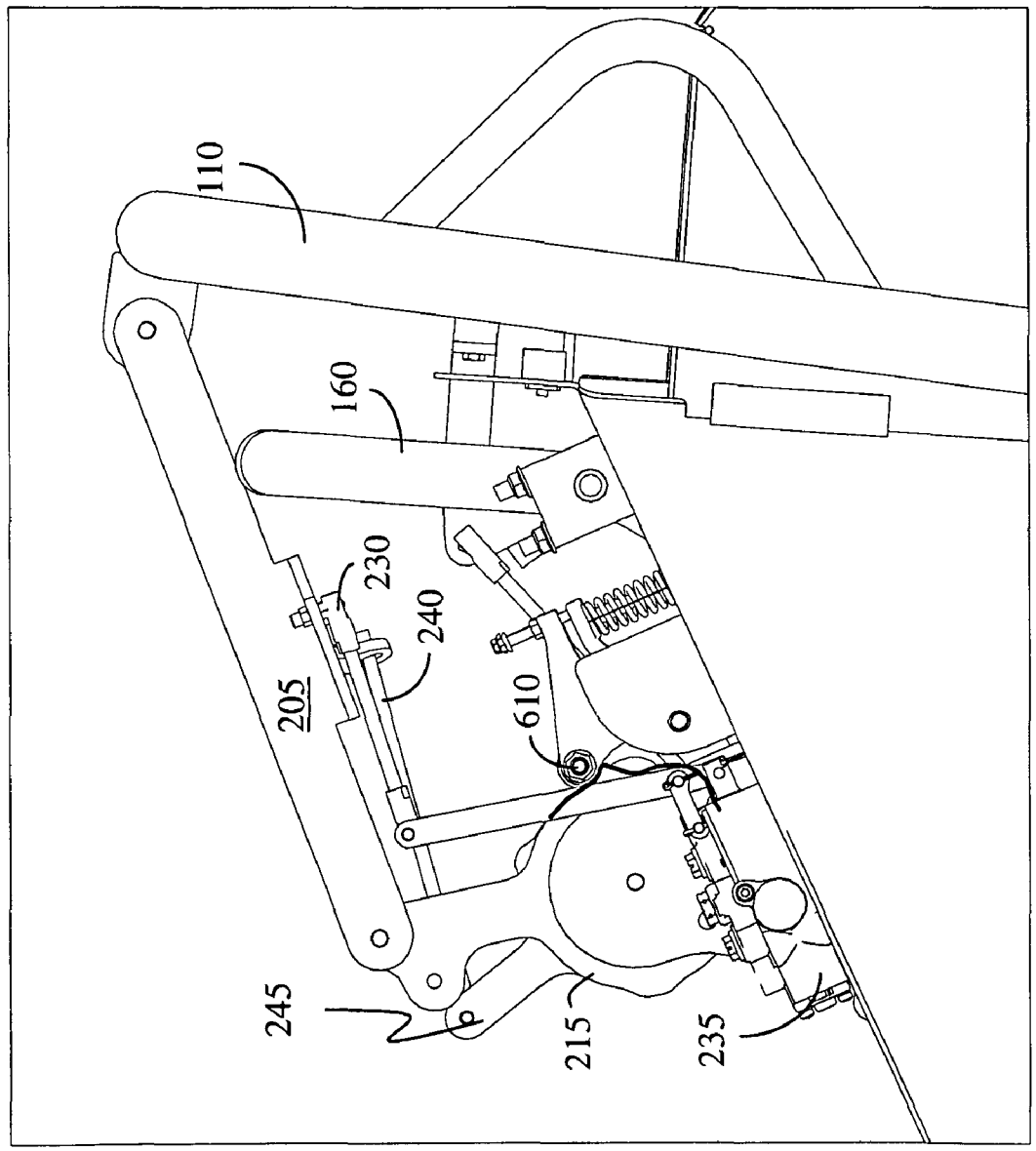

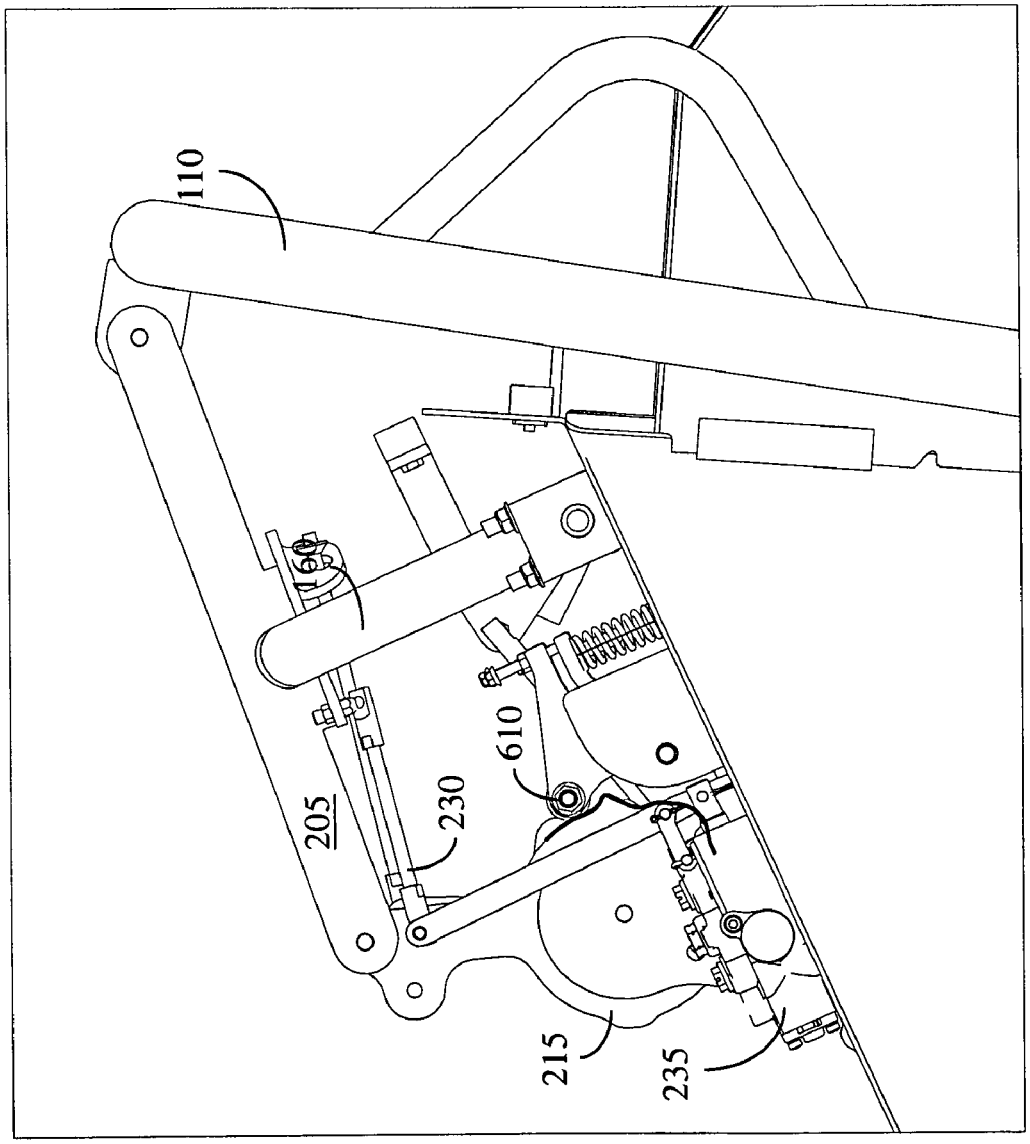

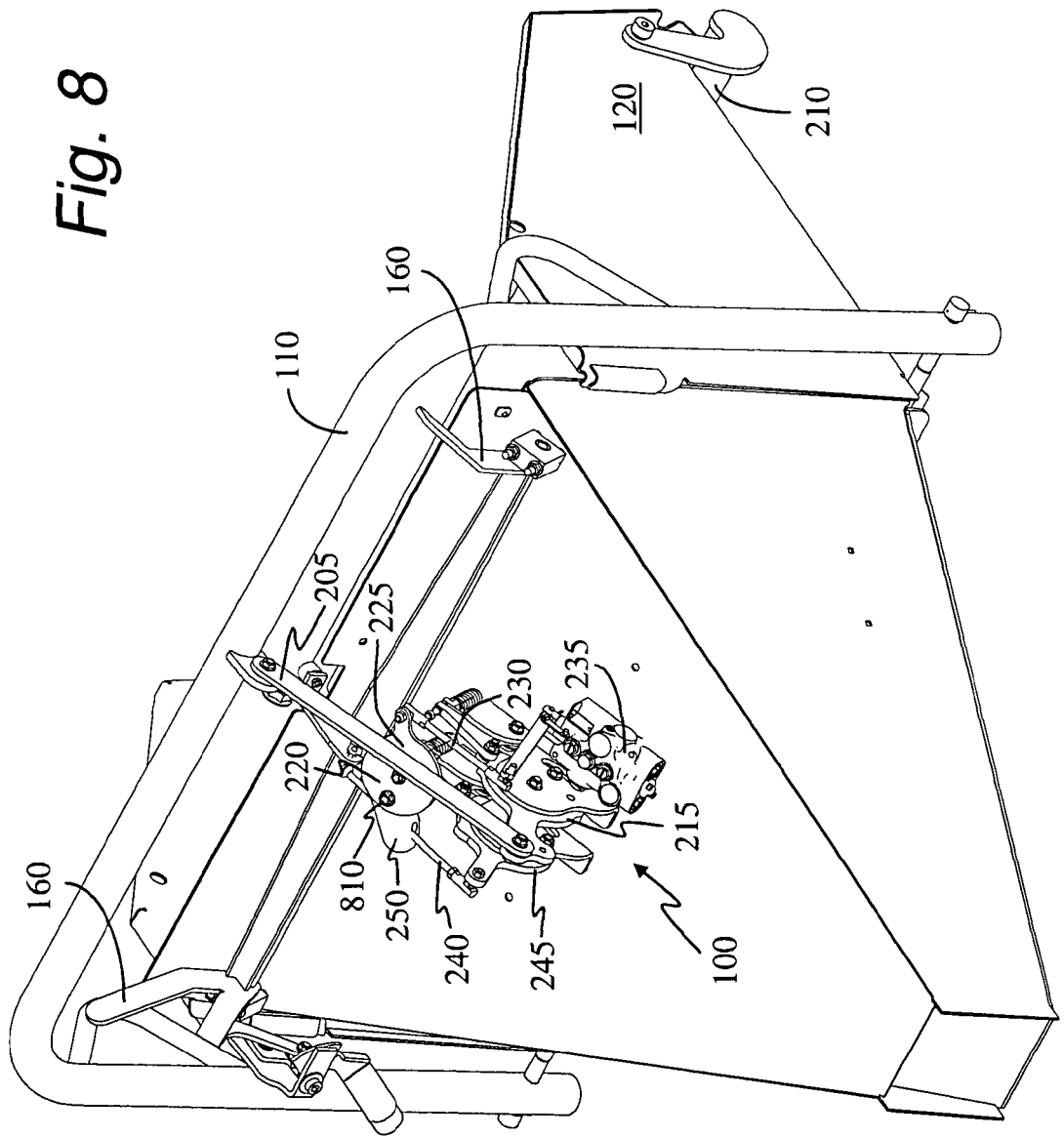

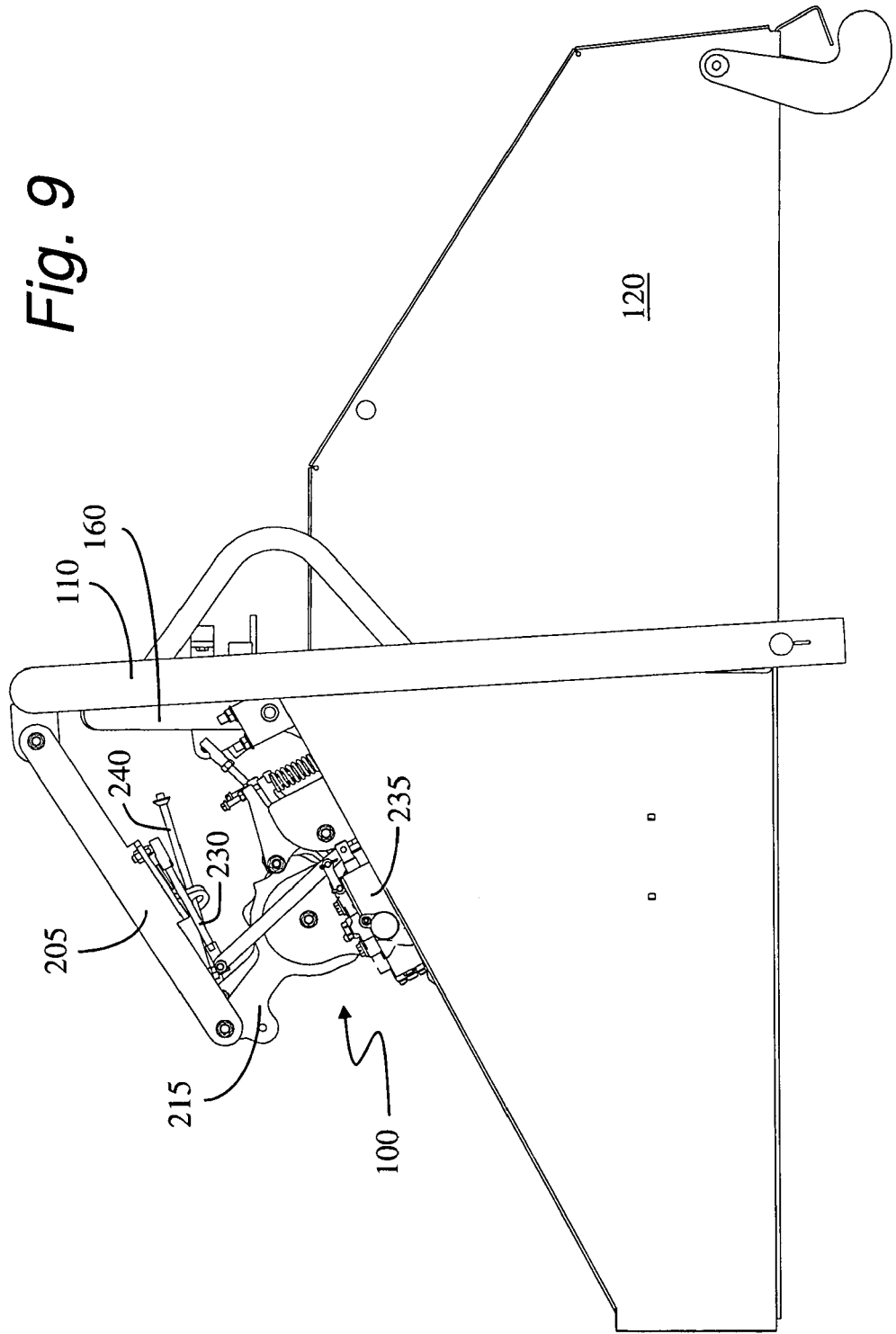

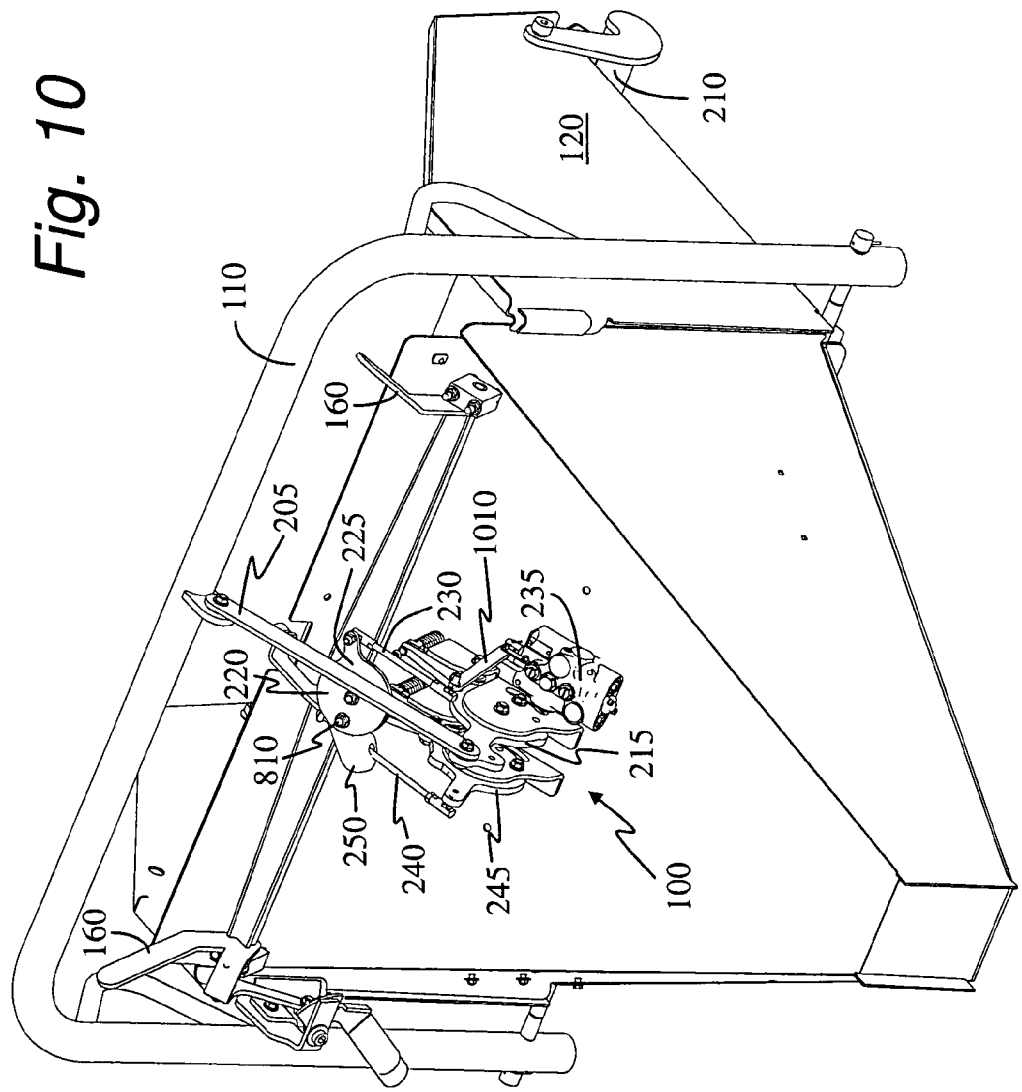

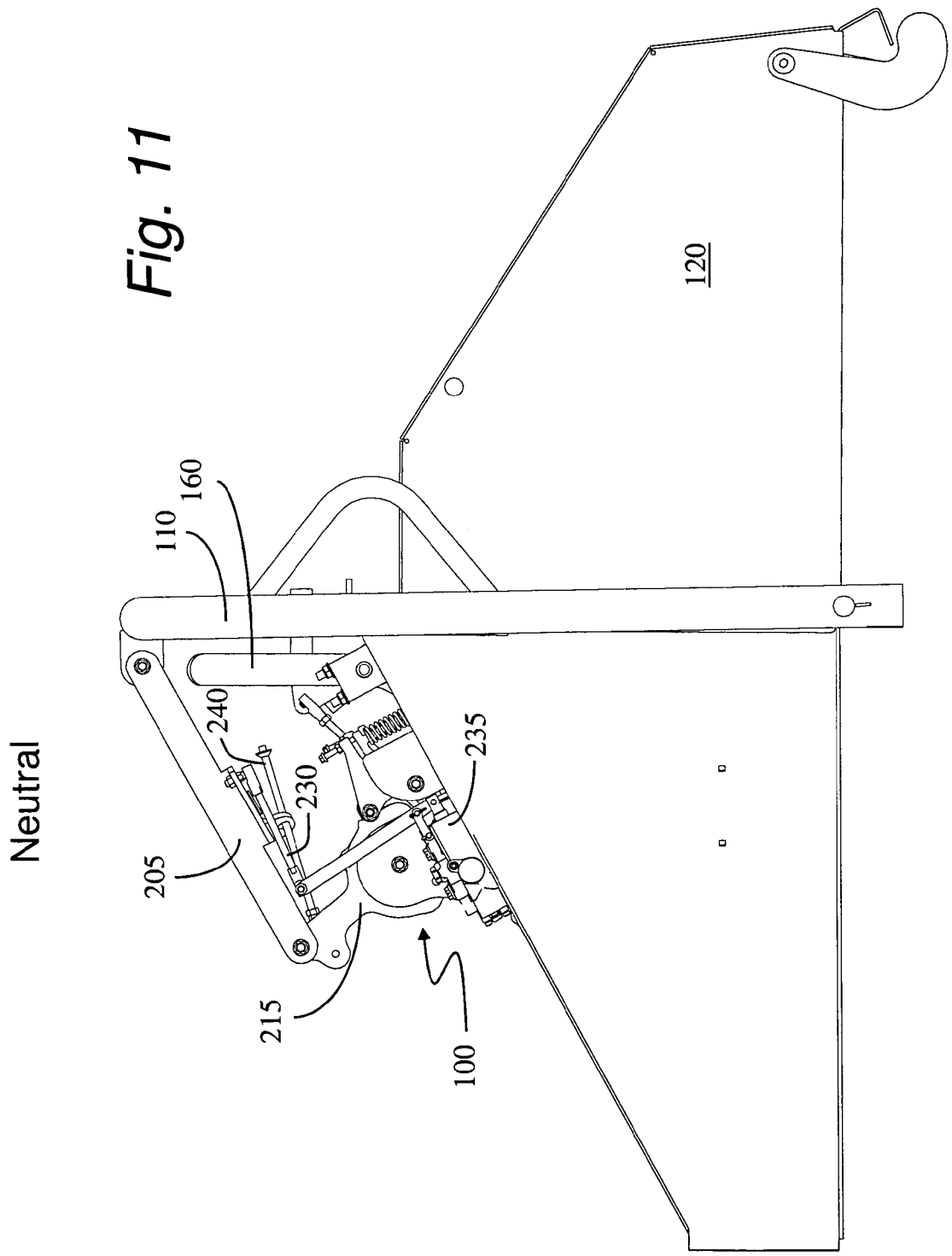

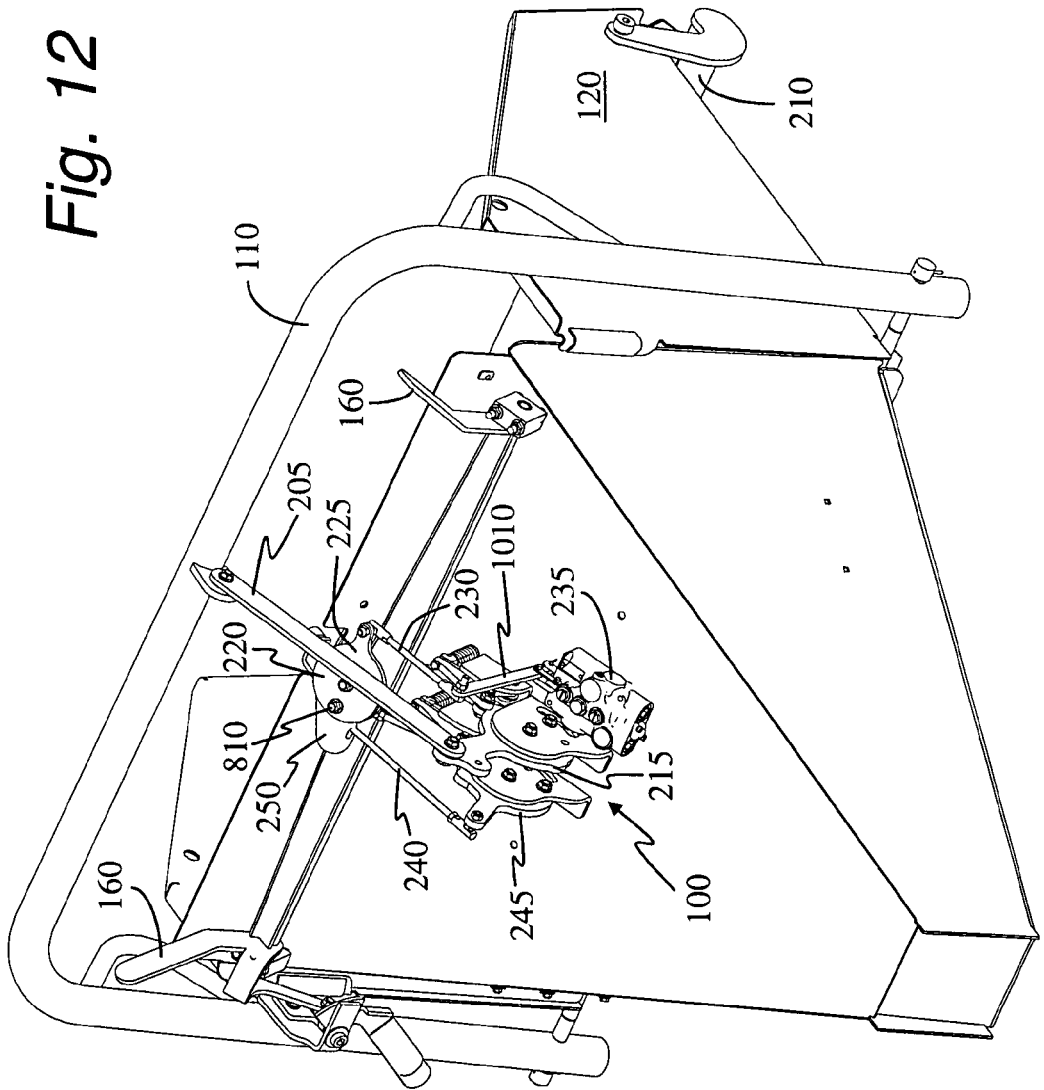

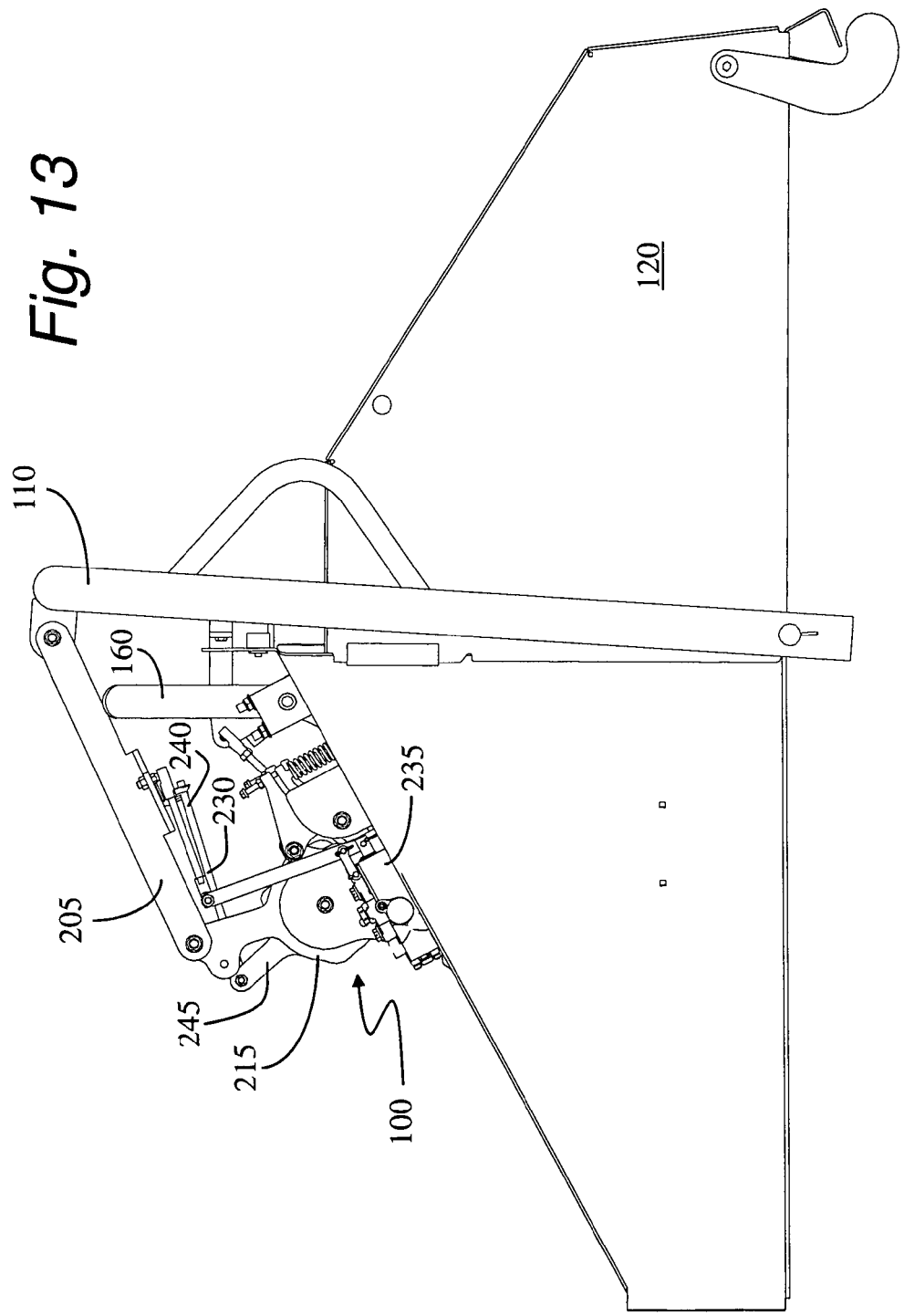

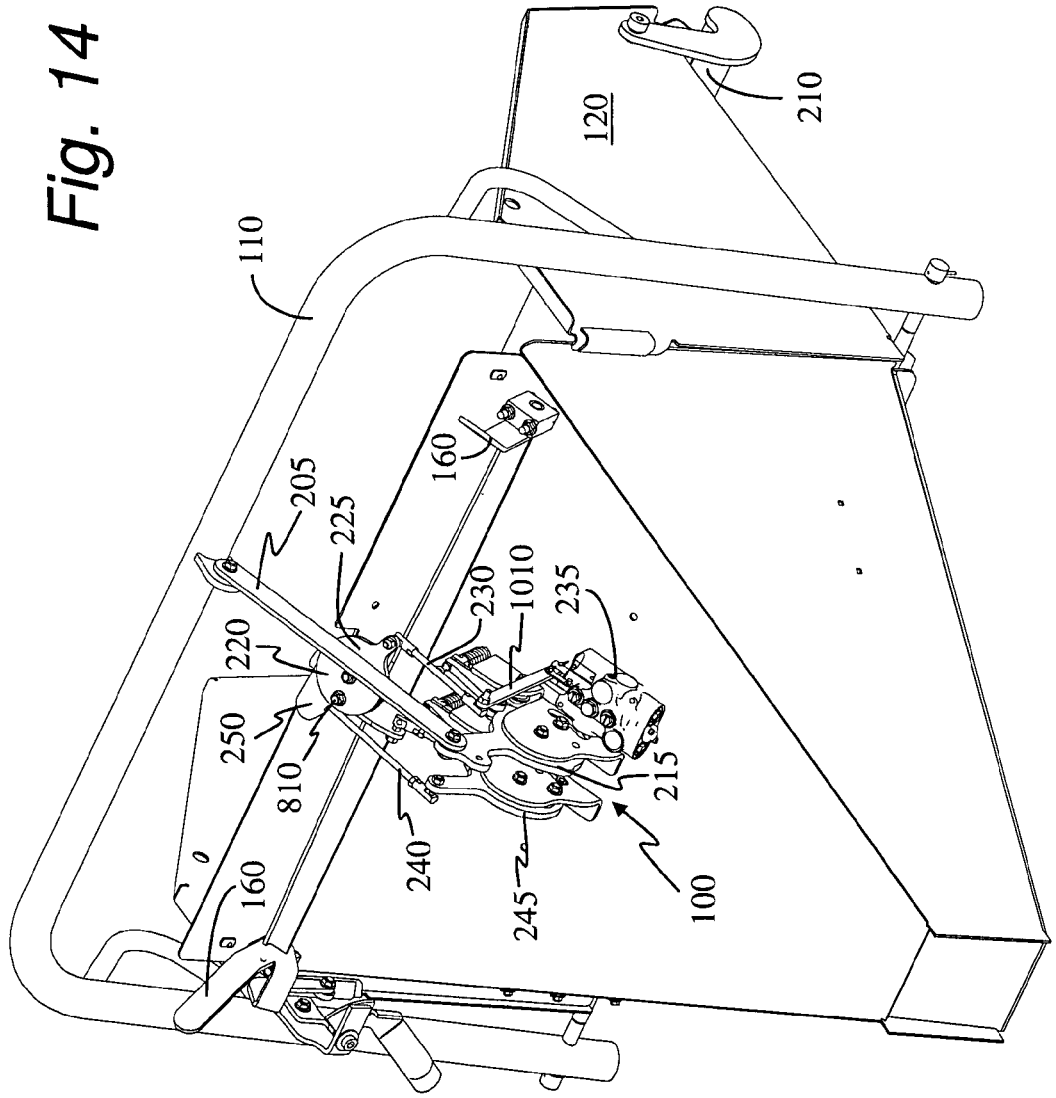

MECHANICAL BRUSH CHIPPER FEED CONTROL BAR

CROSS REFERENCE TO RELATED APPLICATIONS

This application is a Divisional of U.S. Ser. No. 11/172,209 filed Jun. 30, 2005, entitled MECHANICAL FOUR POSITION FEED CONTROL BAR FOR A BRUSH CHIPPER, and is incorporated by reference herein in its entirety.

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

This invention relates to feed control for a brush chipper. More particularly, the invention relates to a method and apparatus for providing a stop position to the forward (or feed), neutral, and reverse positions presently associated with brush chipper mechanical feed bar mechanisms. The hydraulic control valve actuated by the feed bar has three positions: forward (or feed), neutral, and reverse.

2. Background Art

Feed control for a brush chipper presently takes one of two forms: (1) mechanical or (2) electrical. Electrical controls require a functioning source of electrical power such as a generator or battery. Mechanical control systems do not require electrical power, but have proved less versatile than the electrical systems in the past.

The feed wheels in a brush chipper are typically hydraulically driven. The flow of hydraulic fluid is controlled by a hydraulic control valve. Hydraulic control valves of the type used for brush chipper feed control have three positions: (1) forward or feed, (2) neutral, and (3) reverse. Mechanical feed control bars, until now, have been configured only to take advantage of these three positions. An implication of this is that, if the feed mechanism becomes plugged or the chipper bogs down due to a greater feed rate than permissible, the operator must carefully find neutral, then reverse. Usually, neutral is centered between forward and reverse, as this is the way the hydraulic control valve is typically arranged.

An electrically controlled brush chipper is disclosed in U.S. patent application number 2004/0108397 entitled Improved Brush Chipper and methods of Operating Same by O'Halloran et al., filed Dec. 1, 2003 and is hereby incorporated by reference. In the disclosed approach, a plurality of operating modes is disclosed using the versatility of electrical/electronic controls.

U.S. Pat. Nos. 5,692,548 by Bouwers et al. and 5,692,549 by Eggers are hereby incorporated by reference and disclose brush chippers having many components of the brush chippers on which the present invention is used. Some of the pertinent components are: a material inlet, or feed table assembly, a plurality of feed rollers, and a chipping drum. The feed rollers are driven by hydraulic motors. No control system for the feed rollers is disclosed.

There is, therefore, a need for a method and apparatus for a mechanical feed control bar providing four positions wherein the extreme positions are stop and reverse.

BRIEF SUMMARY OF THE INVENTION

It is an object of the present invention is to provide a stop position, in addition to the usual forward (or feed), neutral, and reverse positions.

Still another object of the present invention is to provide a stop function to the mechanical feed control bar wherein, when the feed control bar is in its stop position, another lever must be manually manipulated in order to return the feed mechanism to a forward feed. This prevents prematurely feeding material into the chipper before the problem has been fully remedied.

To accomplish the above objects, the feed control assembly comprises an upper feed control bar, a feed control cam, a feed control linkage, a stop cam and an actuator cam. The feed control assembly provides for four individual, distinct positions for the upper feed control bar. In the forward feed, neutral, and stop positions, the upper feed control bar is held in place by a spring loaded roller and notches in the feed control and stop cams. In the reverse position, the upper feed control bar is not held in place by the feed control assembly. Rather, the operator must provide a continuous force to the upper feed control bar as long as reverse action is desired. Nonetheless, the reverse position is a distinct, individual position for the upper feed control bar.

The stop cam has detents for two individual positions, defining the mode of the stop cam: normal or stopped.

A first end of the feed control linkage is pivotally attached to the upper feed control bar while a second end is pivotally attached to the feed control cam so that manipulation of the feed control bar directly influences the position of the feed control cam. Additionally, the upper feed control bar connects with the stop cam via a stop linkage through the actuator cam. The positions of the stop cam and the feed control cam define the four distinct positions of the feed control bar.

Between the first and second ends of the feed control linkage and attached thereto is a support structure to which the actuator cam is pivotally attached. From a first side of the actuator cam, a first linkage runs to the hydraulic control valve. Approximately opposite the first side, a second linkage runs from the actuator cam to the stop cam. The second linkage engages the actuator cam in such a fashion as to permit the actuator cam to apply a tension force to the second linkage, but not a compressive force.

During normal operation, the force applied to the actuator cam by the linkage to the stop cam causes the actuator cam to rotate as the feed control bar is moved from the neutral to the forward feed position. The rotation of the actuator cam is necessary for sufficient actuation of the hydraulic control valve into its forward position. When the feed control bar is pulled beyond the forward feed position, the stop cam is drawn out of the detent position holding it in place, and the second linkage slides back through the aperture in the actuator cam in which it resides. Without the tension force on the second linkage, the actuator cam cannot rotate sufficiently to actuate the hydraulic valve into its forward feed position. However, the actuator cam does not need to rotate to actuate the hydraulic valve into its reverse position. Therefore, even in the stopped mode, the feed mechanism can be reversed.

In the stopped mode, the stop cam is in a stop position, holding the second linkage in such a position as to disallow any forces being applied to it by the actuator cam. The stop cam must be returned to its run position before the feed mechanism can be returned to a forward feed mode. To effect the return of the stop cam to its run position, a reset handle is manually manipulated, effectively rotating the stop cam back to its run detent position by a third linkage operatively engaged by the reset handle and pivotally attached to the stop cam.

BRIEF DESCRIPTION OF THE DRAWINGS

FIG. 4 is a first perspective view of a mechanical feed control assembly for the brush chipper;

FIG. 5 is a second perspective view of a mechanical feed control assembly for the brush chipper;

FIG. 6b is a side elevation view of the feed control assembly with the upper feed control bar in a forward mode and the stop cam in run mode;

FIG. 6h is a side elevation view of the feed control assembly with the upper feed control bar in a stop mode and the stop cam in stop mode;

FIG. 8 is a perspective view of the rear portion of the chipper with the feed control assembly in reverse;

FIG. 9 is a side elevation view of the rear portion of the chipper with the feed control assembly in reverse;

FIG. 10 is a perspective view of the rear portion of the chipper with the feed control assembly in neutral;

FIG. 11 is a side elevation view of the rear portion of the chipper with the feed control assembly in neutral;

FIG. 12 is a perspective view of the rear portion of the chipper with the feed control assembly in forward;

FIG. 13 is a side elevation view of the rear portion of the chipper with the feed control assembly in forward;

FIG. 14 is a perspective view of the rear portion of the chipper with the feed control assembly in a stop position.

DETAILED DESCRIPTION OF THE INVENTION

For the purposes of this document, the term mechanical control is defined as a control system wherein actuation is due to a mechanical linkage from the control bar to the hydraulic control valve. No electrical actuation is incorporated. Of course merely adding electrical components to the mechanical system of the present invention can be done and still be within the scope and spirit of the present invention.

Figure 1:
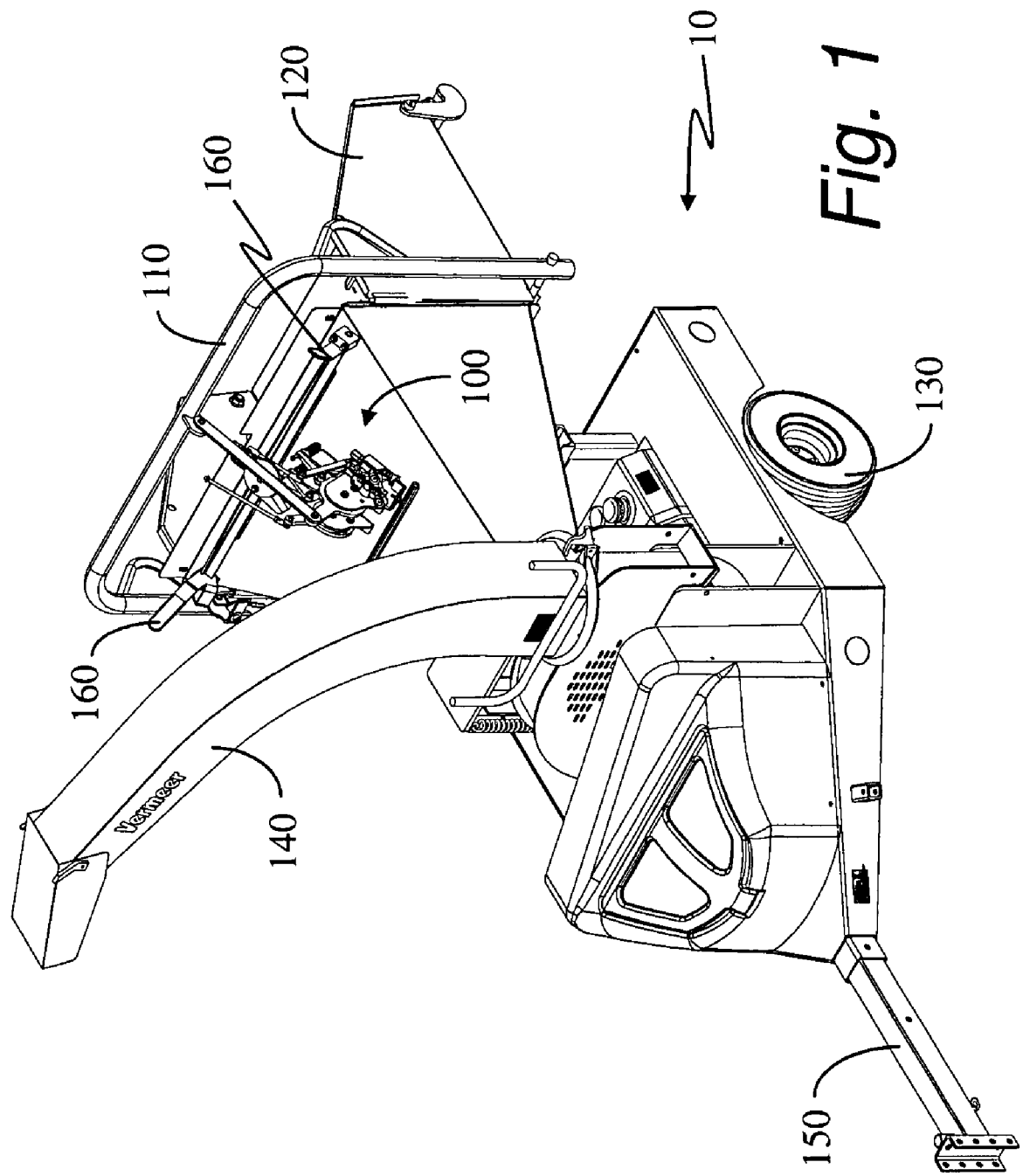
FIG. 1 is a perspective view of a brush chipper showing the feed control assembly of the present invention.

A brush chipper 10 is shown in FIG. 1. The direction of brush feeding is generally controlled through the manipulation of the feed control assembly 100 via the upper feed control bar 110. Generally, the brush chipper comprises a feed table assembly 120, ground engaging wheels 130 (only one seen in FIG. 1), and a conveyance for chipped matter, in this case a chute 140. Not seen in FIG. 1 are a plurality of feed rollers driven by hydraulic motors, and at least one cutter drum or cutter disk.

The brush chipper 10 of FIG. 1 has a front, generally toward the tongue 150, and a rear, generally toward the feed table assembly 120. In keeping with these definitions, the forward direction is defined as toward the front of the chipper, while the backward or rearward direction is defined as toward the rear of the chipper. These terms are hereby defined and will be used as above throughout this document, including the claims.

Figure 2:
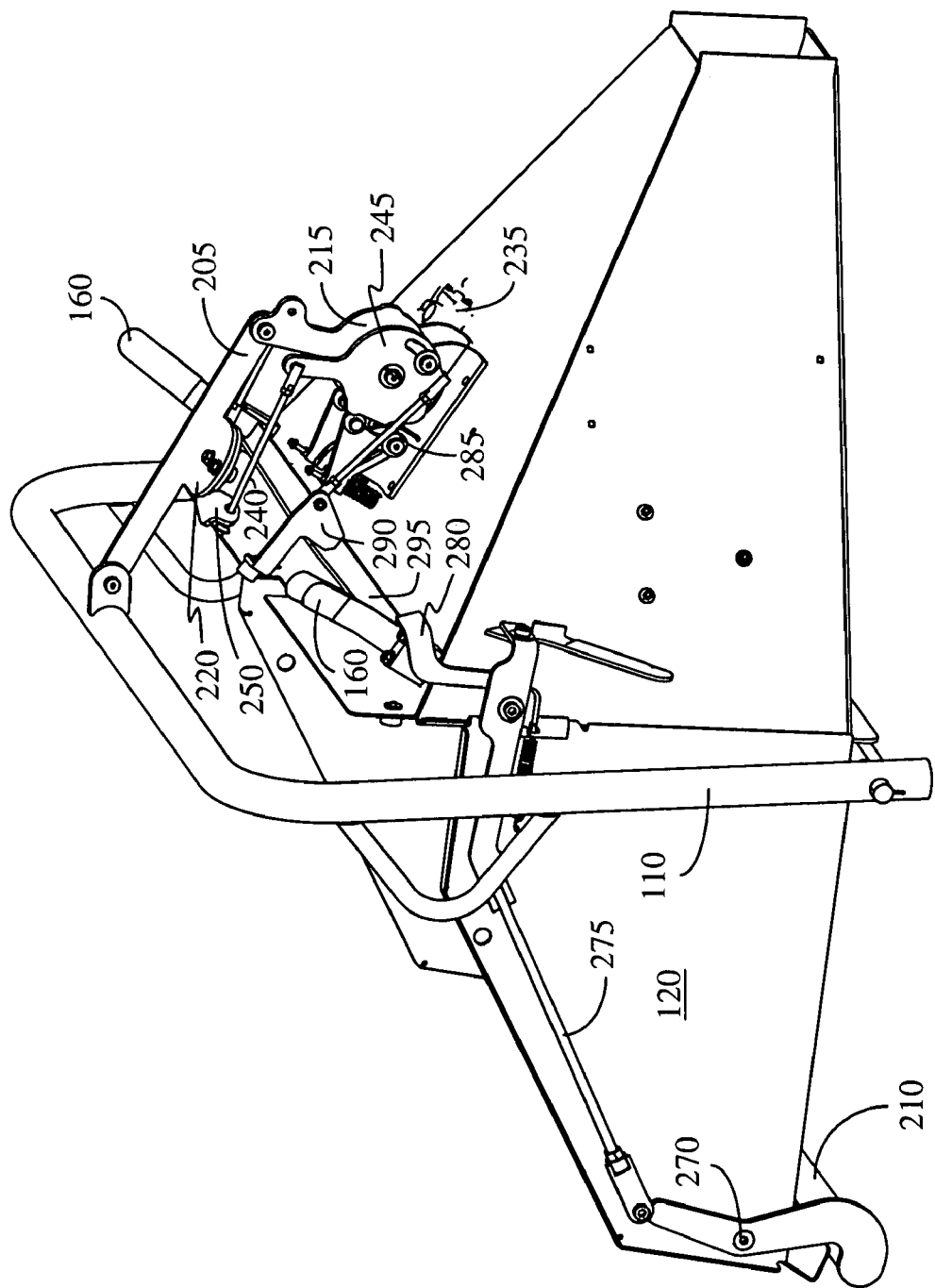
FIG. 2 is a first perspective view of a rear portion of the brush chipper.
Figure 3:
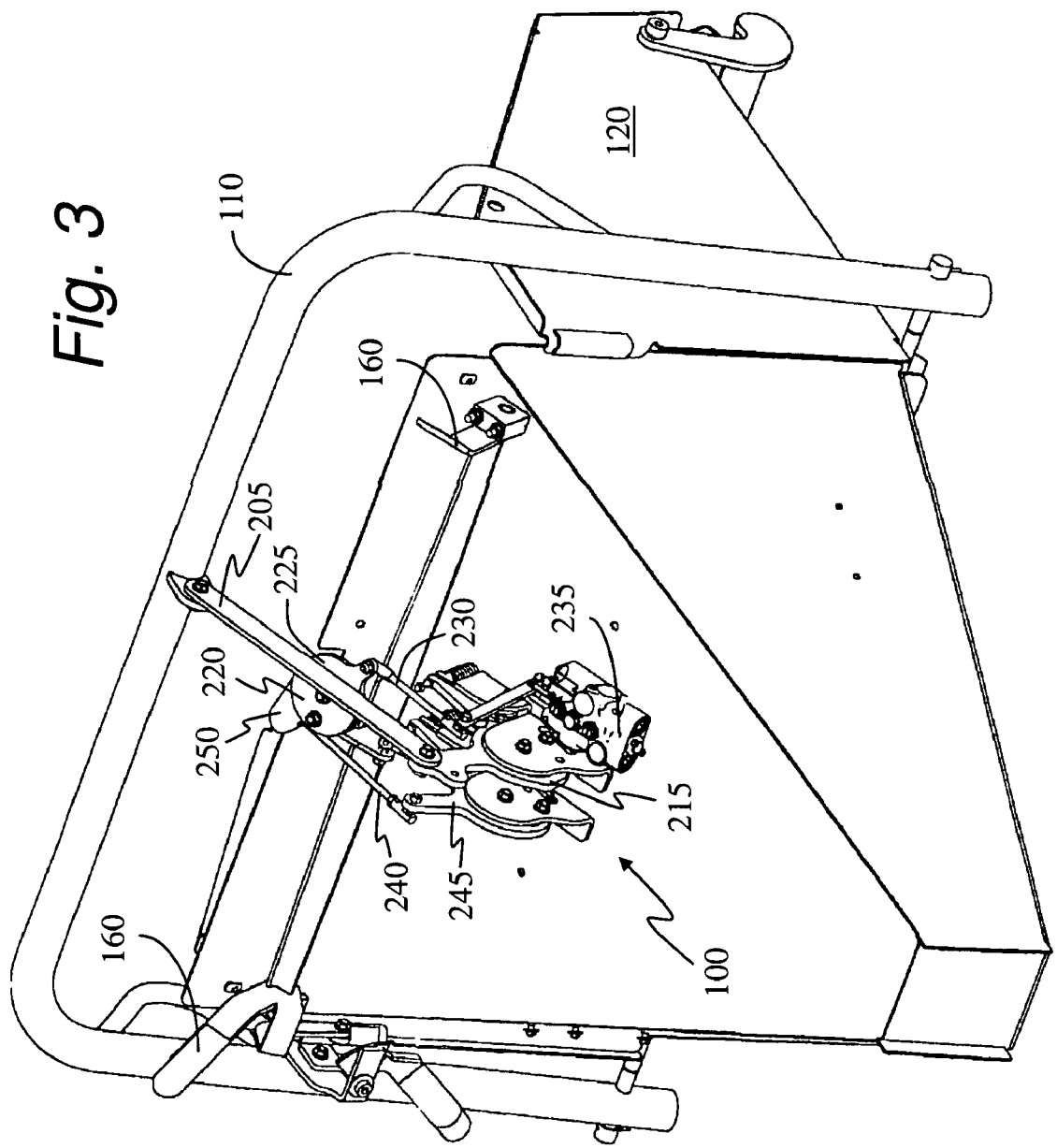
FIG. 3 is a second perspective view of a rear portion of the brush chipper.

A rear portion of the brush chipper 10, including the feed table assembly 120, is shown in FIGS. 2 and 3. The upper feed control bar 110 is clearly seen. A first end of a feed control linkage 205 is pivotally attached to the upper feed control bar 110 while a second end of the feed control linkage 205 is pivotally attached to a feed control cam 215 so that manipulation of the feed control bar 110 directly influences the position of the feed control cam 215. Combined, the feed control cam 215 and the stop cam 245, define four individual, distinct positions of the upper feed control bar 110.

Between the first and second ends of the feed control linkage 205 and attached to the feed control linkage 205 is a support structure 220 to which an actuator cam 225, best seen in FIG. 4, is pivotally attached. From a first side of the actuator cam 225, a valve linkage 230, best viewed in FIGS. 3 and 4, runs to the hydraulic control valve 235 which is a spring-centered hydraulic control valve 235. Approximately opposite the first side of the actuator cam 225, a stop linkage 240 runs from the actuator cam 225 to a stop cam 245 (see also FIG. 5). The stop linkage 240 engages the actuator cam 225 in such a fashion as to permit the actuator cam 225 to apply a tension force to the stop linkage 240, but not a compressive force. This is effected by permitting the stop linkage 240 to slide rearward through an aperture in a bracket 250 integral with, or affixed to, the actuator cam 225 when the feed control assembly 100 is set to its stop position.

During normal operation, the force applied to the actuator cam 225 by the stop linkage 240 causes the actuator cam 225 to rotate as the feed control bar 110 is moved from a neutral position to a forward feed position. The rotation of the actuator cam 225 is necessary for sufficient actuation of the hydraulic control valve 235. When the feed control bar 110 is pulled rearward, beyond the forward feed position, the stop cam 245 is drawn out of its detent position where it was held in place, and the stop linkage 240 slides rearward through the aperture in the bracket 250 of the actuator cam 225 in which it resides. Without the tension force on the stop linkage 240, the actuator cam 225 does not rotate sufficiently to actuate the hydraulic control valve 235 to its forward feed position. However, the actuator cam 225 does not need to rotate to actuate the hydraulic control valve 235 into its reverse position. Therefore, even in the stopped mode, the brush chipper feed mechanism 100 can be reversed by an operator.

In the stopped mode, the stop cam 245 is in a stop position, holding the stop linkage 240 in such a position as to disallow any forces being applied to the stop cam 245 by the actuator cam 225 via the stop linkage 240. The stop cam 245 must be returned to its run position before the feed mechanism can be returned to a forward feed mode. To effect the return of the stop cam 245 to its run position, a reset handle 160 is manually manipulated, effectively rotating the stop cam back to its run position by a third linkage operatively engaged by the reset handle and pivotally attached to the stop cam.

A lower feed control bar 210 is also seen in FIG. 2. Manipulation of the lower feed control bar 210 shifts the feed control assembly 100 into the stop mode. When the lower feed control bar 210 is moved forward, pivoting on its axis of rotation 270, a lower feed bar linkage 275 is drawn rearward tripping the reset handles 160 via a trip lever 280.

Figure 6A:
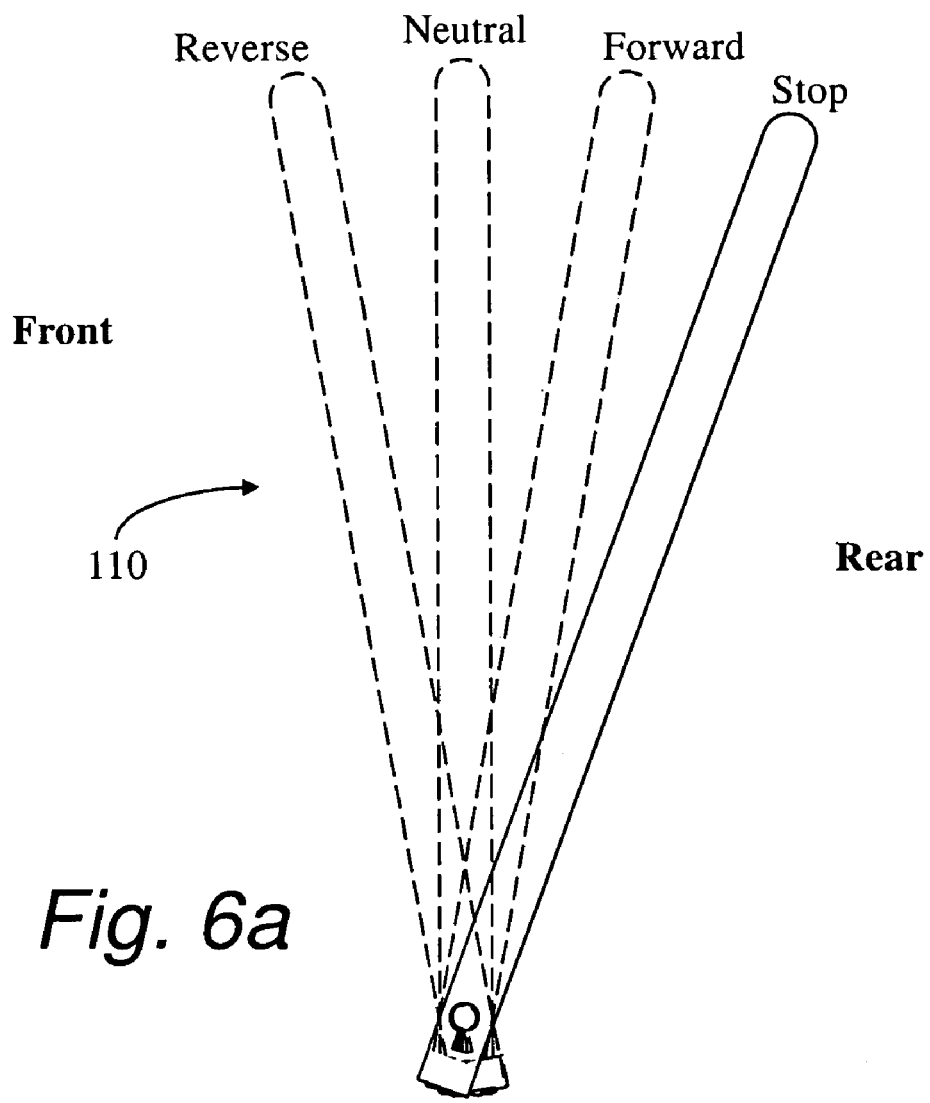
FIG. 6a is a side elevation view of an upper feed control bar in a plurality of positions.

The four positions of the upper feed control bar 110 are shown in FIGS. 8-15. In FIG. 6*a*, the upper feed control bar is shown alone in its four (4) positions:

1. Stop
2. Forward
3. Neutral
4. Reverse in order from rearmost to front-most. This order represents the preferred embodiment, but the present invention is not limited thereto. An advantage of the present invention is that the extreme positions of the upper feed control bar 110, both front and back, are positions that either stop or reverse the feed rollers.

FIGS. 6*b*-6*h* show the seven combinations of the feed control cam 215 and the stop cam 245. The brush chipper 10 operates in a forward-feed, or normal operating mode when the feed control assembly 100 is as shown in FIG. 6*b*. The stop cam 245 is in its run position, while the feed control cam 215 is in its forward position. The feed control cam 215 is kept from rotating by the spring-loaded cam roller 600 and the shape of the feed control cam 215. The combination of the feed control cam 215 and stop cam 245 positions results in the hydraulic control valve 235 being positioned in its forward feed position.

Figure 6C:
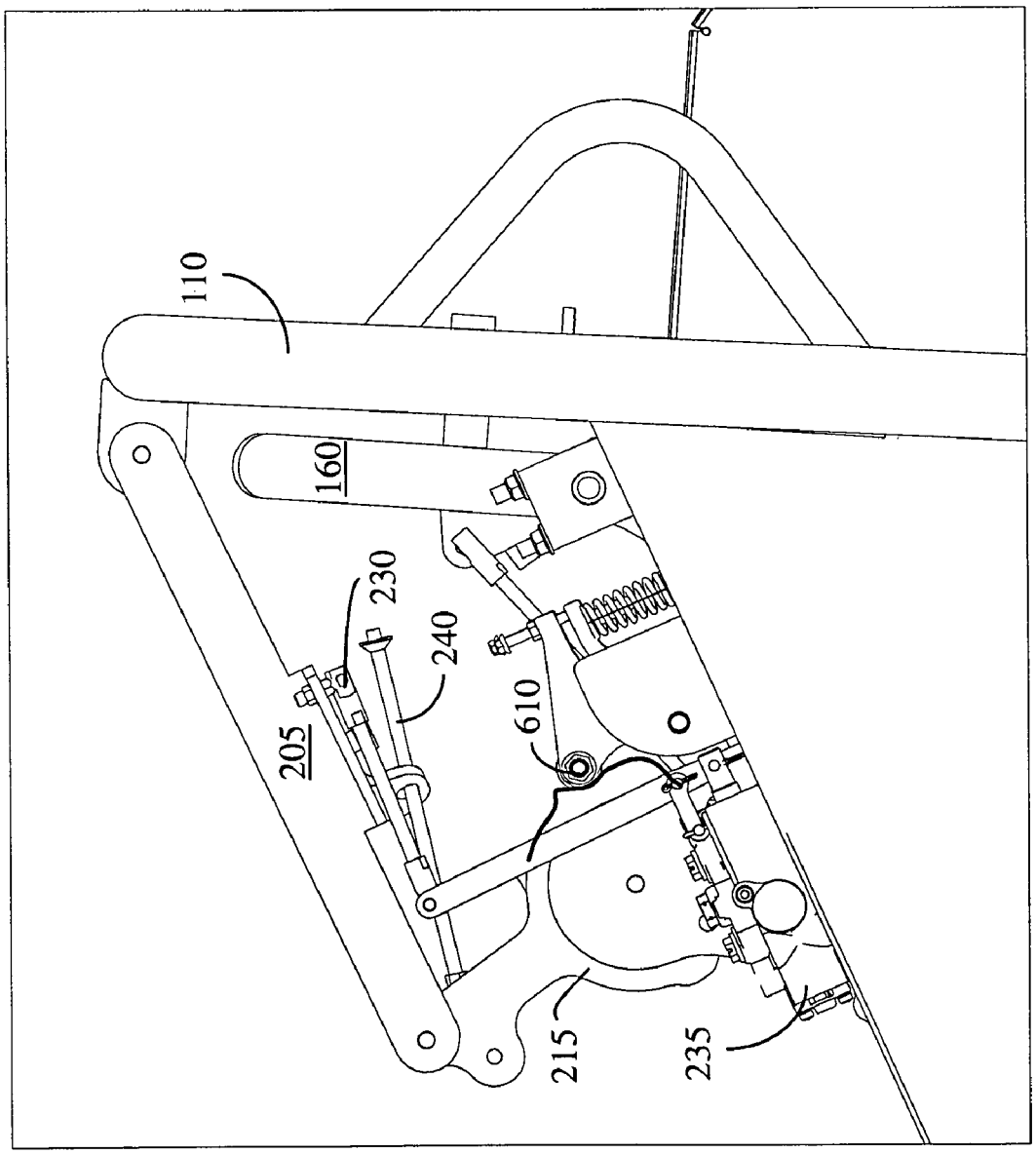
FIG. 6c is a side elevation view of the feed control assembly with the upper feed control bar in a neutral mode and the stop cam in run mode.

In FIG. 6*c*, the brush chipper 10 is in its neutral mode. The stop cam 245 is in its run position, while the feed control cam 215 is held in its neutral position by the spring-loaded cam roller 600. Therefore, the hydraulic control valve 235 is positioned in its neutral position. In the configuration of FIG. 6*c*, the operating mode of the brush chipper 10 may be changed simply by changing the position of the upper feed control bar 110.

Figure 6D:
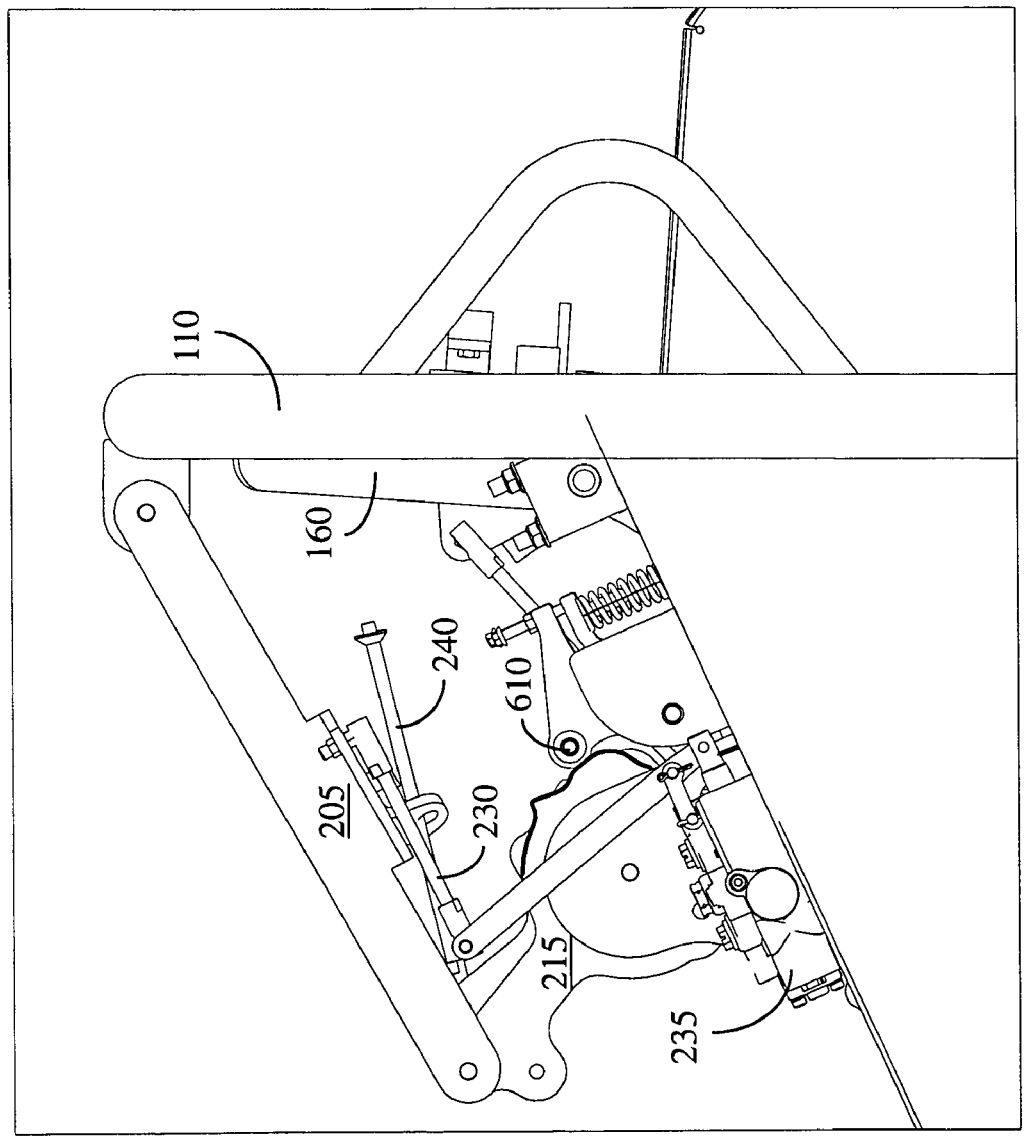
FIG. 6d is a side elevation view of the feed control assembly with the upper feed control bar in a reverse mode and the stop cam in run mode.

The brush chipper 10 operates in a reverse-feed mode when the feed control assembly 100 is as shown in FIG. 6*d*. The stop cam 245 is in its run position, while the feed control cam 215 is held in its reverse position by the spring-loaded cam roller 600. Therefore, the hydraulic control valve 235 is positioned in its reverse feed position. In this reverse position, the operator must hold the upper feed control bar 110 in place as long as reverse feed is desired.

Figure 6E:
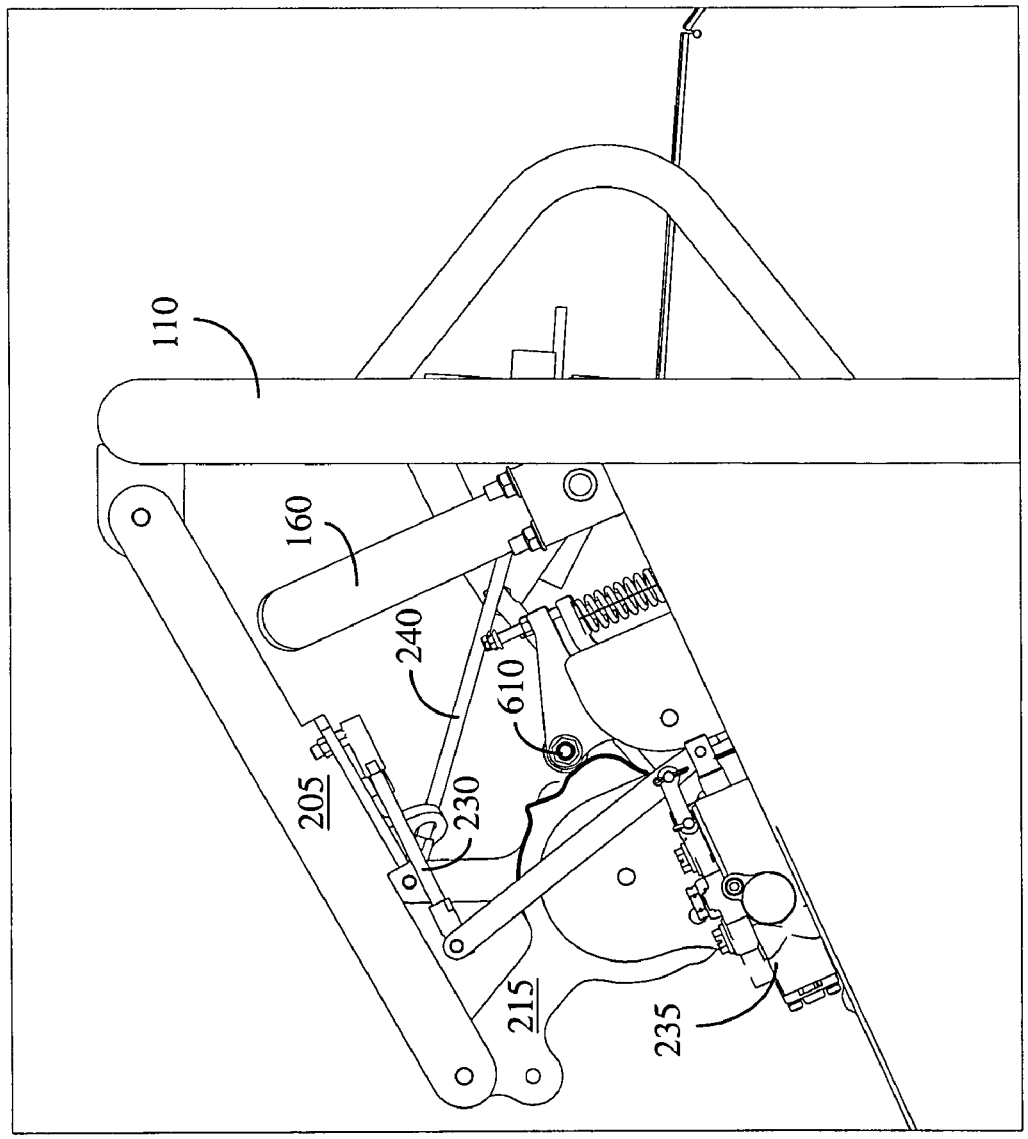
FIG. 6e is a side elevation view of the feed control assembly with the upper feed control bar in a reverse mode and the stop cam in stop mode.

In FIG. 6*e*, the feed control cam 215 is shown in its reverse position while the stop cam 245 is in its stop position. Despite the stop cam 245 being in its stop position, in this configuration, the brush chipper feed mechanism operates in reverse, as indicated by the hydraulic control valve's 235 position. As above, the feed control cam 215 is held in position by the spring-loaded cam roller 600.

Figure 6F:
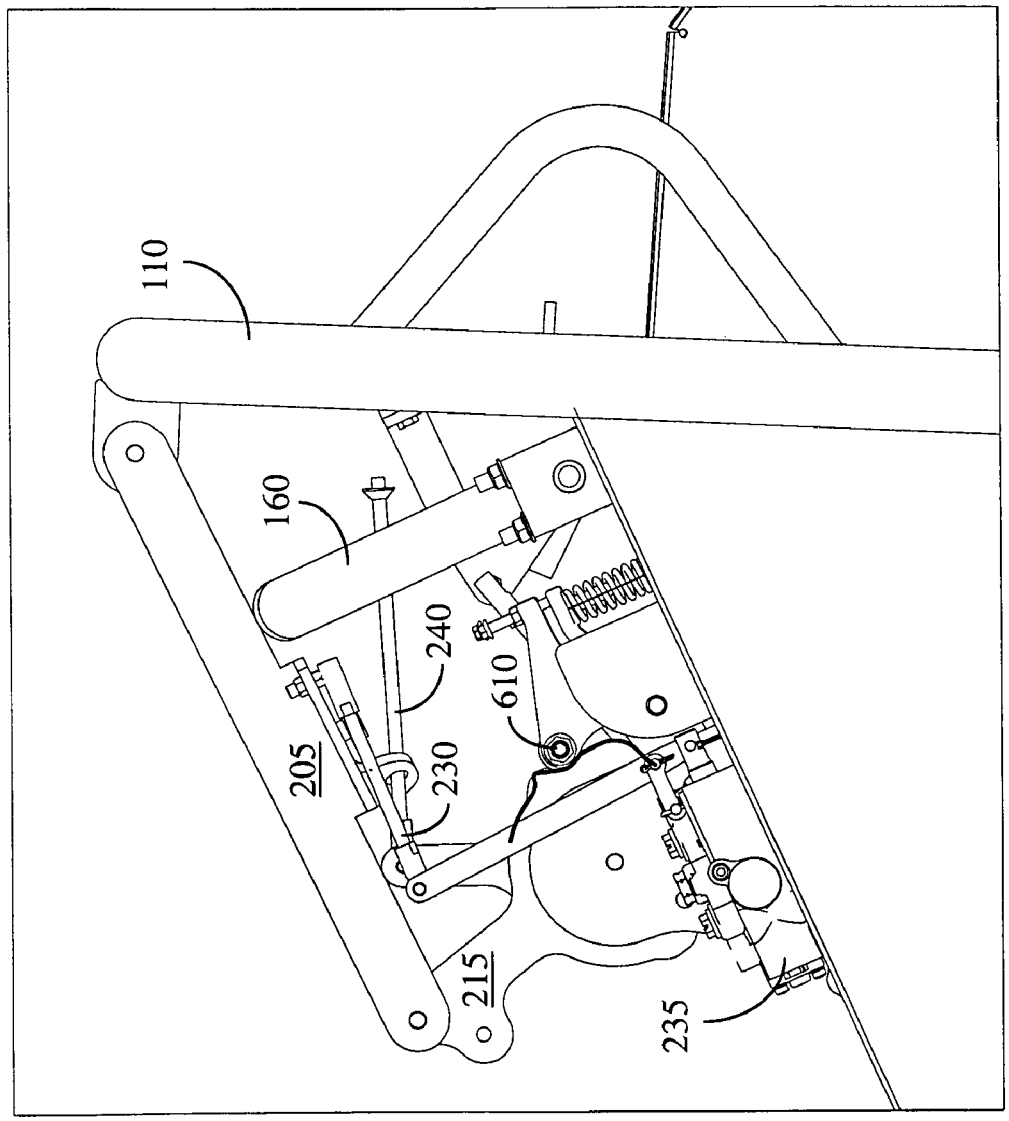
FIG. 6f is a side elevation view of the feed control assembly with the upper feed control bar in a neutral mode and the stop cam in stop mode.

In FIG. 6*f*, the upper feed control bar 110 is shown in its neutral position while the stop cam 245 is in its stop position. No feed is provided to the feed mechanism of the brush chipper 10. The feed control cam 215 is held in position by the spring-loaded cam roller 600.

Figure 6G:
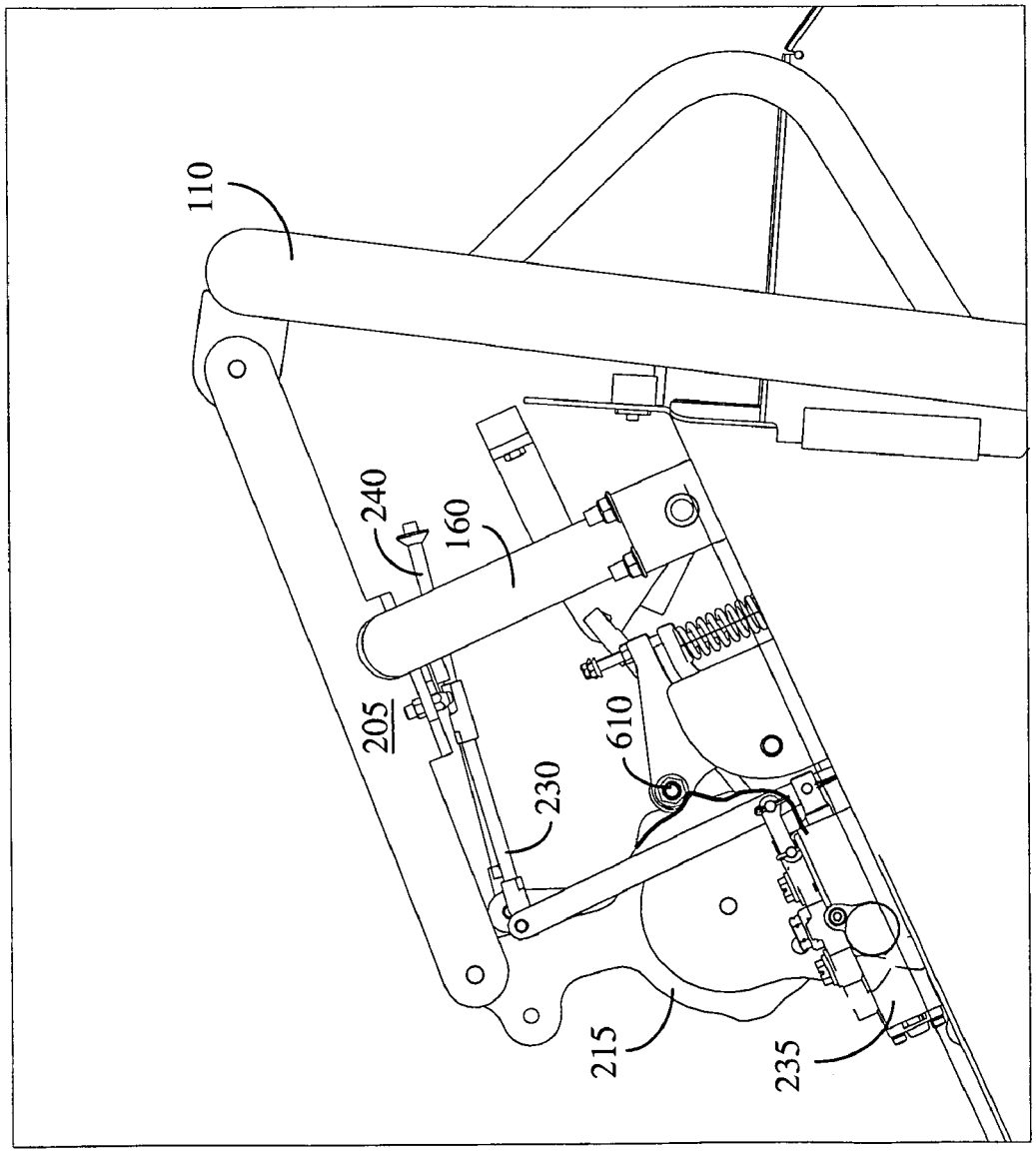
FIG. 6g is a side elevation view of the feed control assembly with the upper feed control bar in a forward mode and the stop cam in stop mode.

In FIG. 6*g*, the upper feed control bar 110 is shown in its forward position while the stop cam 245 is in its stop position. Despite the upper feed control bar 110 being in its forward position in this configuration, no feed is provided to the brush chipper's feed mechanism, as indicated by the hydraulic control valve's 235 position. The feed control cam 215 is held in position by the spring-loaded cam roller 600.

In FIG. 6*h*, the upper feed control bar 110 is shown in its stop position while the stop cam 245 is in its stop position. This is the emergency stop mode for the brush chipper 10, and no feed is provided to the brush chipper's feed mechanism, as indicated by the hydraulic control valve's 235 position. The feed control cam 215 is held in position by the spring-loaded cam roller 600.

Figure 7:
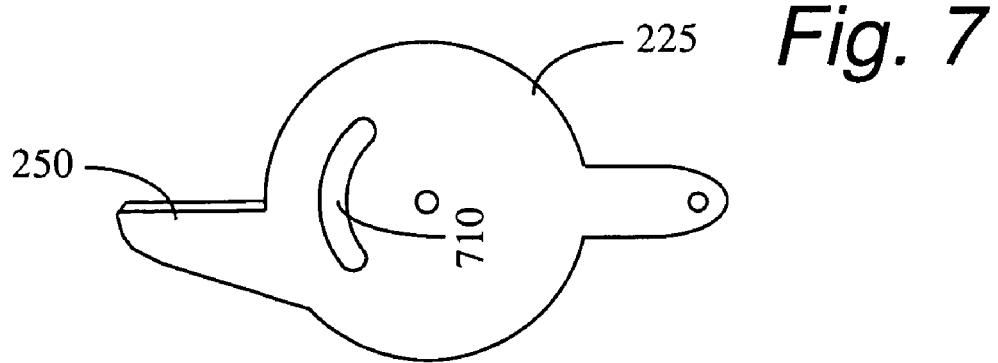
FIG. 7 is a detail of an actuator cam.

In the reverse position shown in FIGS. 8 and 9, the upper feed control bar 110 is pushed to its front-most position. The compression force on the valve linkage 230 tends to rotate the actuator cam 225 in a counterclockwise direction (from above as seen in FIG. 8) until an end of the arcuate slot 710 shown in FIG. 7 engages a bolt 810. The actuator cam 225 is then able to apply an adequate compressive force to the valve linkage 230 to actuate the hydraulic control valve 235. The stop linkage 240 is free to slide through the bracket 250. The reset handles 160 are in their rearmost, or operating, position.

The position just rearward from the reverse position of the upper feed control bar 110 is the neutral position and is illustrated in FIGS. 10 and 11. In this position, there is no significant force on the valve linkage 230. The bolt 810 needs not bear against nor apply a force to the end of the arcuate slot 710 in the actuator cam 225. The stop linkage 240 is still slid through the bracket 250, so it cannot apply a force to the actuator cam 225. Because the hydraulic control valve 235 is spring-centered, the lack of force on the hydraulic control valve's lever 1010 results in its return to center, which is the neutral position. The reset handles 160 remain in their rearmost, or operating, position.

Immediately rearward from the neutral position, the upper feed control bar 110 is in its forward or feed position as illustrated in FIGS. 12 and 13. The stop linkage 240 has now engaged the bracket 250 on the actuator cam 225 and applies a first force to the actuator cam 225 tending to rotate the actuator cam 225 in a counterclockwise direction as viewed from the top. The first force counteracts a second force applied by the valve linkage 230 to the actuator cam 225. The result is the actuation of the hydraulic control valve's lever 1010 in a rearward direction, which provides a forward feed to the brush feed mechanism. The reset handles 160 remain in their rearmost, or operating, position.

The stop position is the extreme rearward position of the upper feed control bar 110. In this position, the feed control cam 215 is not held in position by a detent. The valve linkage 230 applies a force to the actuator cam 225 tending to rotate the actuator cam 225 in a clockwise direction as viewed from above. As the upper feed control bar 110 is pulled back, the hydraulic control valve's lever 1010 reaches its rearmost position, beyond which it cannot travel. Therefore, the force applied to the actuator cam 225 by the valve linkage 230 is significant. This force is somewhat countered by the stop linkage 240. However, the valve linkage 230 applies the greater force, and the stop cam 245 is rotated out of its detent position, permitting the actuator cam 225 to rotate clockwise (as seen from the top as in FIG. 14) under the force of the valve linkage 230. The stop cam 245 is rotated such that the stop linkage 240 travels rearward, sliding through the bracket 250 of the actuator cam 225. With the stop linkage 240 unable to apply a force to the bracket 250, the actuator cam 225 is free to rotate. The only source of force to the actuator cam 225, other than friction, is from the valve linkage 230. However, the actuator cam 225 cannot support a force because it rotates freely. Hence, the hydraulic control valve lever 1010 will return to the center or neutral position because the hydraulic control valve 235 is spring-centered.

Figure 15:
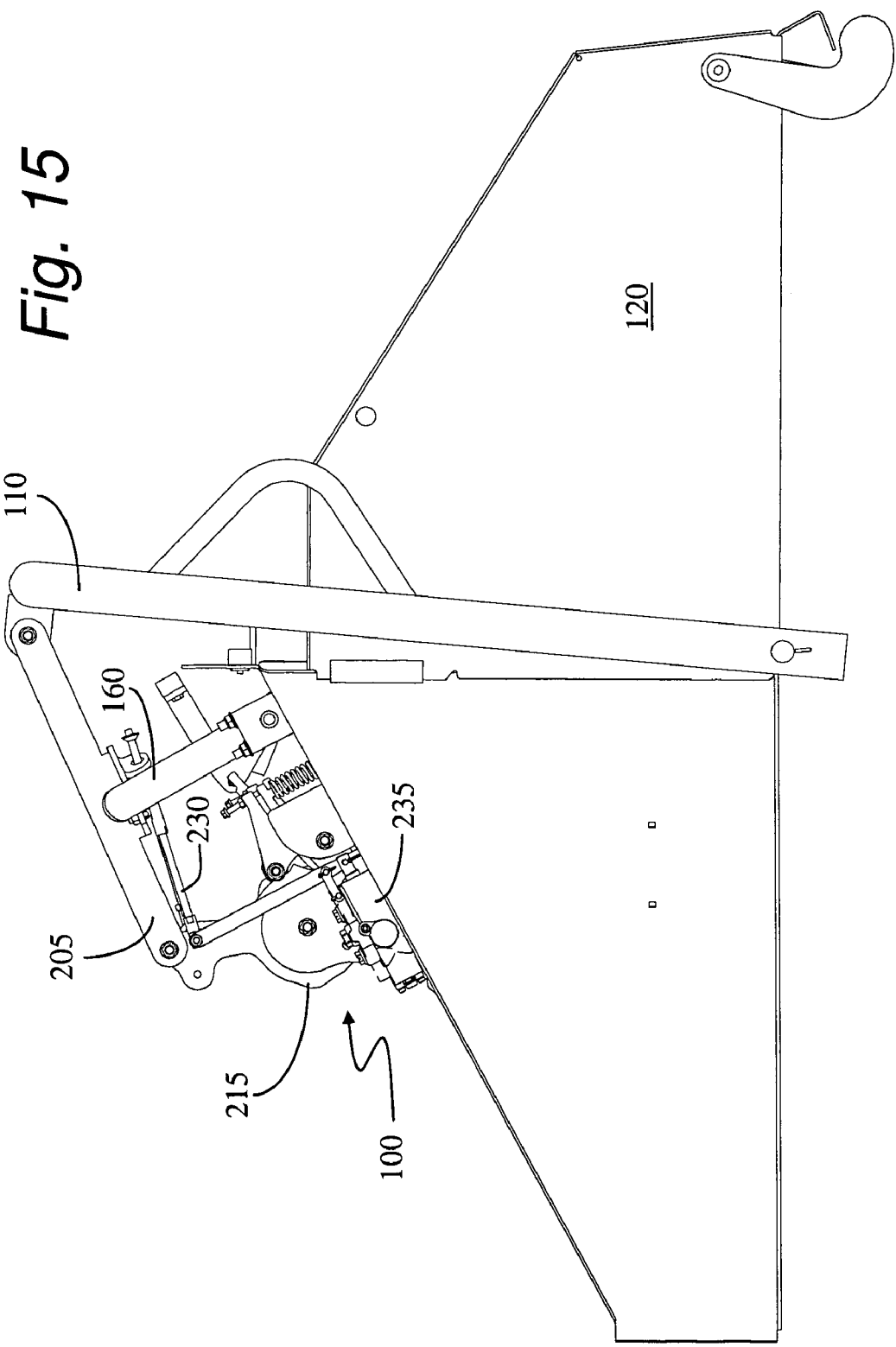
FIG. 15 is a side elevation view of the rear portion of the chipper with the feed control assembly in a stop position.

The reset handles 160 have been tripped into their frontmost, or tripped, position in FIGS. 14 and 15. Returning to FIG. 2, a trip linkage 285 is pivotally connected to the stop cam 245. In turn, the trip linkage is pivotally attached to a bumper 290 which is connected to an angle member 295 affixed to the two reset handles 160. When the trip linkage 285 is drawn forward due to the stop cam 245 being rotated out of its detent, the bumper 290 is also drawn forward along with the angle member 295 connected to the reset handles 160. Manually drawing the reset handles 160 back resets the stop cam 245 and readies the feed control assembly 100 for normal service.

Another aspect of the present invention is a safety measure when the brush chipper 10 is readied up for transport. The feed table assembly 120 is folded up from the rear and contacts the bumper 290 which forces the trip linkage 285 forward and rotates the stop cam 245 out of its detent. This puts the feed control assembly 100 into its stop position, disallowing brush or anything else to be fed into the brush chipper's 10 cutters by the feed rollers.

The above embodiment is the preferred embodiment, but this invention is not limited thereto. It is, therefore, apparent that many modifications and variations of the present invention are possible in light of the above teachings. It is, therefore, to be understood that within the scope of the appended claims, the invention may be practiced otherwise than as specifically described.

We claim:

1. An apparatus for chipping brush comprising at least one feed roller, a feed table, and a feed control assembly comprising:
    an upper feed control bar, operatively pivotally connected to the feed table;
    a feed control cam having at least four positions that define at least four distinct positions for the upper feed bar;
    a feed control linkage having a first end and a second end, the first end being operatively, pivotally connected to the upper feed bar while the second end is operatively, pivotally connected to the feed control cam;
    a support structure located between the first and second ends of the feed control linkage;
    a stop cam having two detent positions including an operating position and a stop position;
    a spring-centered hydraulic control valve having three positions including feed, stop, and reverse; and
    an actuator cam operatively, pivotally mounted to the support structure of the feed control link and operatively connected to the stop cam on a first side and the control valve on a second, opposite side and wherein the actuator cam rotates relative to the support structure of the feed control link such that the actuator cam actuates the control valve to one of said three positions as the upper feed control bar moves to any of the upper feed control bar's four positions.

2. The apparatus of claim 1 additionally comprising:
    (a) a stop linkage, a first end of the stop linkage being operatively pivotally connected to the stop cam;
    (b) a bracket operatively, rigidly affixed to the actuator cam; and
    (c) an aperture in the bracket, a second end of the stop linkage passing through said aperture and engaging the bracket to support a tension force in the stop linkage but not a compressive force.

3. An improvement to a brush chipper having a hydraulically powered feed roller, a feed roller motor driving said feed roller, a control valve with a spool positioned by mechanical linkage to control a flow to the feed roller motor, a feed table, and a feed control linkage, the improvement comprising:
    an upper feed control bar operatively, pivotally connected to the feed table;
    a feed control link operatively, pivotally connected to a feed control cam at a first end of the feed control link, and operatively, pivotally connected to the upper feed bar at a second end of the feed control link;
    wherein the feed control link further includes a support structure operatively connected to an actuator cam operatively connected to the feed control valve.

* * * * *